(No Model.)

W. H. McKENNA.
LATHE.

No. 490,918. Patented Jan. 31, 1893.

WITNESSES
Warren H. Swartz
H. M. Corwin

INVENTOR
William H. McKenna
by W. Bakewell & Sons
his Attorneys

UNITED STATES PATENT OFFICE.

WILLIAM H. McKENNA, OF ALLEGHENY, PENNSYLVANIA.

LATHE.

SPECIFICATION forming part of Letters Patent No. 490,918, dated January 31, 1893.

Application filed May 26, 1892. Serial No. 434,434. (No model.)

*To all whom it may concern:*

Be it known that I, WILLIAM H. MCKENNA, of Allegheny, in the county of Allegheny and State of Pennsylvania, have invented a new and useful Improvement in Lathes, of which the following is a full, clear, and exact description, reference being had to the accompanying drawings, in which—

Figure 1:
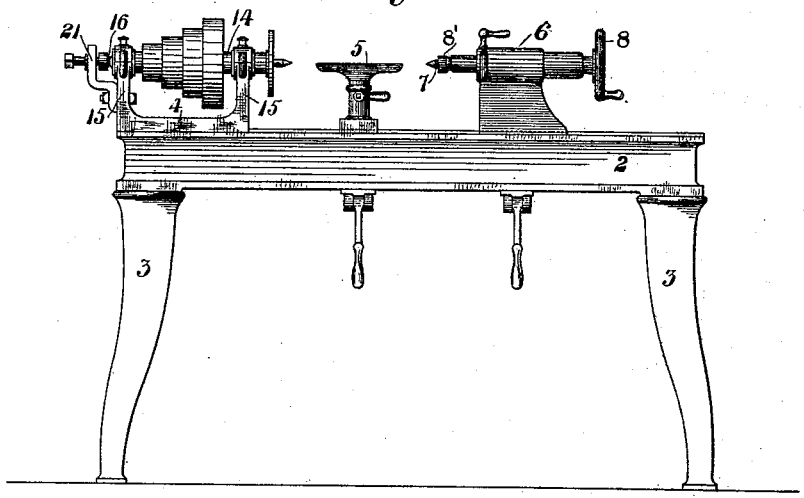
Figure 2:
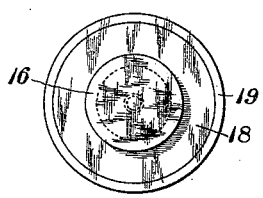
Figure 3:
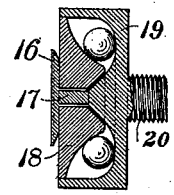
Figure 4:
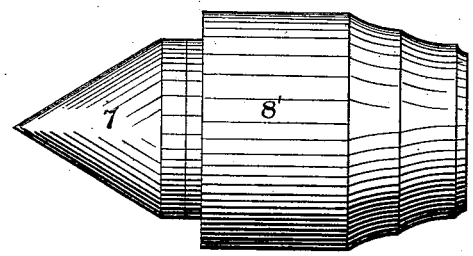
Figure 5:
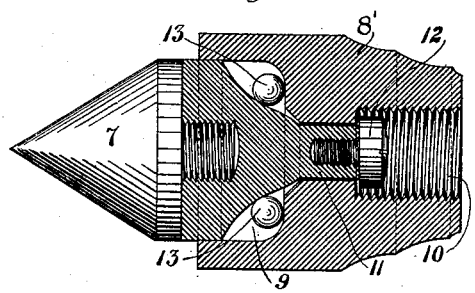

Figure 1 is a front elevation of a lathe provided with my improved centers. Fig. 2 is a plan view, and Fig. 3 a longitudinal sectional view of the rotatable inner end of the bearing-screw for the live mandrel of the head stock. Fig. 4 is a side elevation of the rotatable inner end of the tail-stock spindle; and Fig. 5 is a similar view, partly broken away.

My invention relates to the construction of turning-lathes, and is designed to greatly improve the construction of the centers upon which the parts rotate.

To that end it consists in a center having a rotatable end portion against which the rotary parts press, as well as in the construction and arrangement of the parts as hereinafter more fully described and set forth in the claims.

In the drawings, 2 indicates the bed of a lathe supported upon the legs 3, and carrying the usual head-stock 4, tool-rest 5 and tail-stock 6. The tail-stock is provided with a center 7, carried upon a screw-threaded spindle extending through the stock and adjusted longitudinally by the hand-wheel 8. The center, instead of being rigid with the spindle as formerly, is rotatable thereon, as shown in Figs. 4 and 5, the center being in the form of a short cylinder terminating in a cone as shown. The spindle terminates in a head 8', which is provided with a large circular recess 9 in its front end, and with a screw-threaded recess 10 in its rear end, by which it is attached to the spindle, the two communicating by a smaller sized hole through which passes the hollow stem 11 of the center proper, it being held in place by screw 12 passing thereinto. A series of balls 13 are placed in the recess 9 and bear upon the beveled sides of the center, which thus rotates upon a ball bearing. The stem 11 is preferably of such length that when the screw buts against the end thereof, the center is not drawn forcibly against the balls, but is forced against them by the endwise motion of the spindle when the article is inserted. I also provide a rotatable center in place of the screw which has heretofore been used to bear upon the rear end of the live mandrel. The rear end of this mandrel 14 projects through the puppet or support 15, and terminates in a rounded or convex end, as shown in Fig. 1. This end bears against the small disk 16, shown in Figs. 2 and 3, this disk having a stem 17 entering a hole in a larger disk 18, whose beveled inner face bears upon a series of balls carried in a circular recess in the head 19 within which the disk rotates, this head being carried upon the screw spindle 20, which passes through a screw-threaded hole in the bearing 21 secured to the puppet. The disk 16 may be removed and the mandrel forced directly against the disk 18 if desired. A rotary center is thus obtained, which takes the thrust at each end of the lathe and does away with the wear and grinding away of the centers, which have heretofore necessitated their frequent centering and renewal.

It will be understood that plain bearings may be used for the centers instead of the ball bearings shown, and many other changes may be made in the form and arrangement of the parts without departure from my invention; since

What I claim is:—

1. A lathe having a separable rotary thrust-block secured beyond the outer end of the head-stock and arranged to press against the protruding end of the live mandrel substantially as described.

2. In a lathe having the usual head-block and live mandrel, a rotatory thrust block outside the mandrel-bearing and arranged to press against the projecting end of the mandrel, and a screw spindle carrying said thrust-block; substantially as described.

3. A lathe, having a brace secured to the outer end of the head-stock, a screw-threaded spindle passing therethrough, and a rotatory thrust-block carried upon the spindle and arranged to press against the protruding end of the live spindle; substantially as described.

4. A lathe having a brace secured to the outer end of the head-stock, a screw-threaded spindle passing therethrough, and a rotatory thrust-block carried upon the spindle and provided with a disk having a ball-bearing and arranged to press against the protruding end of the live spindle; substantially as described.

In testimony whereof I have hereunto set my hand this 24th day of May, A. D. 1892.

WILLIAM H. McKENNA.

Witnesses:
H. M. CORWIN,
W. B. CORWIN.